Sept. 30, 1969   L. AVONDOGLIO   3,469,633
CONTROL MEANS FOR AIR DRIVEN TURBINES
Filed Oct. 19, 1967   2 Sheets-Sheet 1

INVENTOR.
LEO AVONDOGLIO

Sept. 30, 1969    L. AVONDOGLIO    3,469,633
CONTROL MEANS FOR AIR DRIVEN TURBINES
Filed Oct. 19, 1967    2 Sheets-Sheet 2

INVENTOR.
LEO AVONDOGLIO

United States Patent Office 3,469,633
Patented Sept. 30, 1969

3,469,633
CONTROL MEANS FOR AIR DRIVEN TURBINES
Leo Avondoglio, North Caldwell, N.J., assignor to General Dynamics Corporation, a corporation of Delaware
Filed Oct. 19, 1967, Ser. No. 676,487
Int. Cl. F03d 7/04
U.S. Cl. 170—160.16                      7 Claims

ABSTRACT OF THE DISCLOSURE

A variable pitch air driven turbine desired to be operative at a constant, preselected speed within design limits under conditions of varying air speed or load is provided with an automatic speed governor system including centrifugal flyweights attached to each turbine blade, the flyweights being designed to offset centrifugal twisting forces acting on each blade as well as to cooperate directly with a regulating balance spring for precisely controlling the pitch of each blade to maintain desired r.p.m. of the turbine.

SUMMARY OF THE INVENTION

Figure 1:
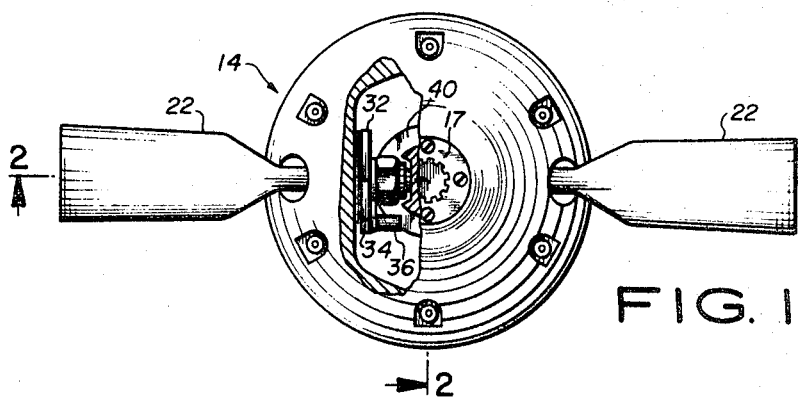

The air turbine of this invention is designed to be operated at a constant high speed under varying air flow velocities, load conditions or other factors, within design limits, for the purpose of driving various aircraft or missile accessory equipment, such as, for example, an alternator. The constant speed characteristic of this turbine is achieved by using variable pitch blades controlled by spring-balanced centrifugal flyweight masses which are attached to each turbine blade at its root end. Each flyweight is specifically designed to offset or neutralize the centrifugal twisting moment to which each rotating blade is subjected due to its mass distribution when the blade is at some pitch angle between zero and ninety degrees, as will be discussed more fully below, and to furthermore cooperate directly with a single balancing spring means so that, at the desired r.p.m. of the turbine, a blade pitch controlling centrifugal twisting moment generated by each flyweight is exactly balanced by the opposing spring force.

While automatic, speed responsive turbine blade pitch control means are generally known, as is the specific use of centrifugal flyweights and balancing springs in blade pitch control systems, the novel features of this invention reside in the particular design and arrangement of components constituting the automatic blade pitch control means which results in an extremely efficient and reliable system with minimal operating parts and furthermore in the means by which the centrifugal forces acting on the turbine system tending to change the pitch setting adversely are neutralized.

In a constant speed, air driven turbine system of the type embodied by the present invention, one of the most important objectives is to obtain a turbine that will require a minimum r.p.m. change to produce an automatic blade pitch correction to readjust r.p.m. Various factors are involved in obtaining such a desired end, but probably the most important is the stability and predictability of the speed governor in maintaining desired r.p.m. both under the influence of variable external conditions (air velocity, load, aerodynamic loadings, etc.) and various fixed or variable internal conditions (friction, spring instability, gyroscopic moments, vibratory stresses, and so forth).

The object of this invention, therefore, is to provide constant speed, variable pitch, high velocity air driven turbine, the speed of which is regulated by automatically changing the pitch of the turbine blades by means of a centrifugal type blade pitch control means specifically designed to compensate for the dynamic centrifugal twisting movement imposed on the blades about their longitudinal axes when they are rotating at high speed as well as to cooperate with a balancing spring for controlling blade pitch angle (and consequently turbine r.p.m.) under various conditions of air speed and turbine loads.

It is further an object of the invention to provide a system such as just described that will be sensitive to r.p.m. changes and relatively stable at the desired turbine speed.

IN THE FIGURES

Figure 2:
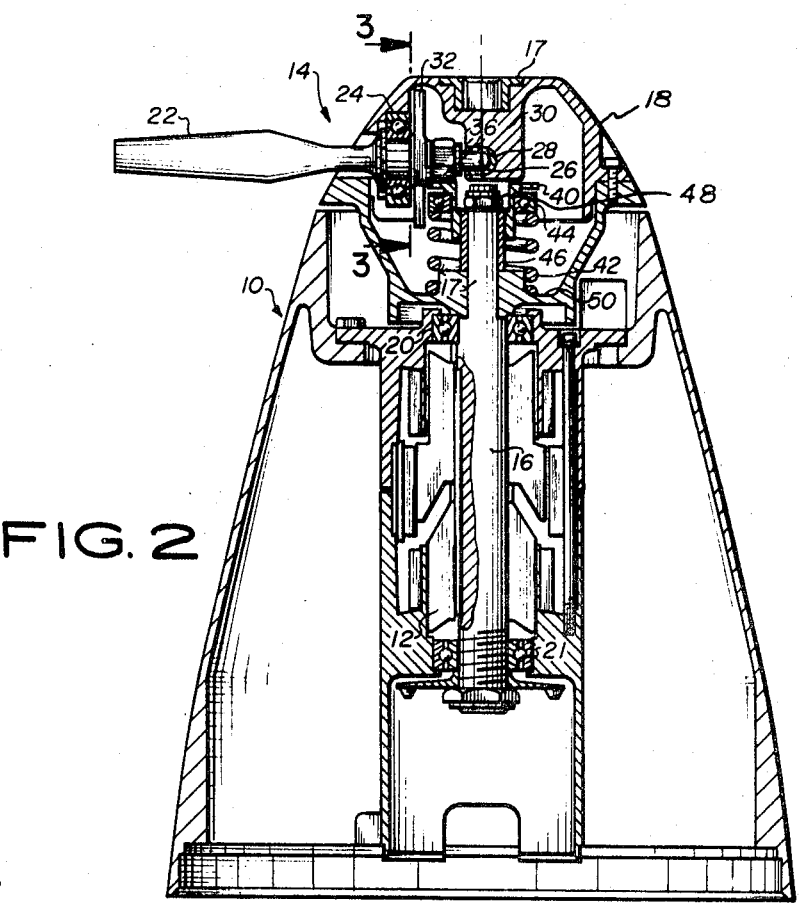
Figure 3:
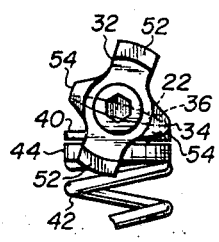
Figure 4:
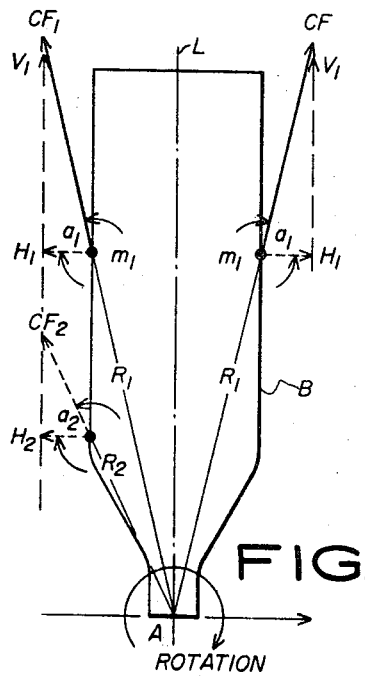
Figure 5:
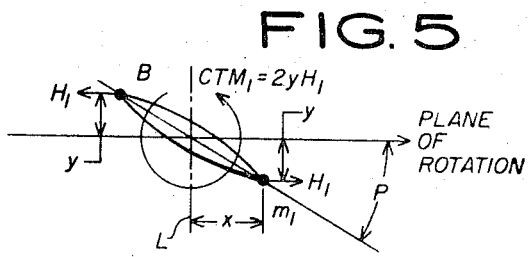
Figure 6:
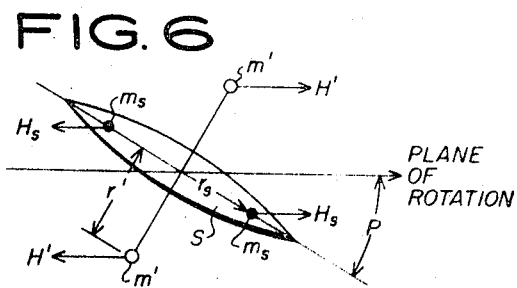
Figure 7:
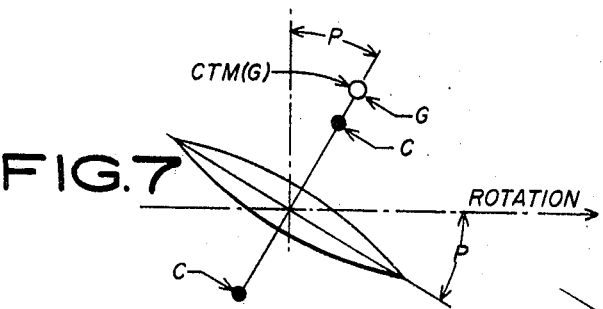
Figure 8:
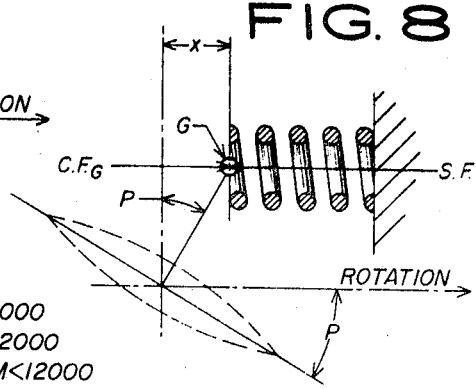
Figure 9:
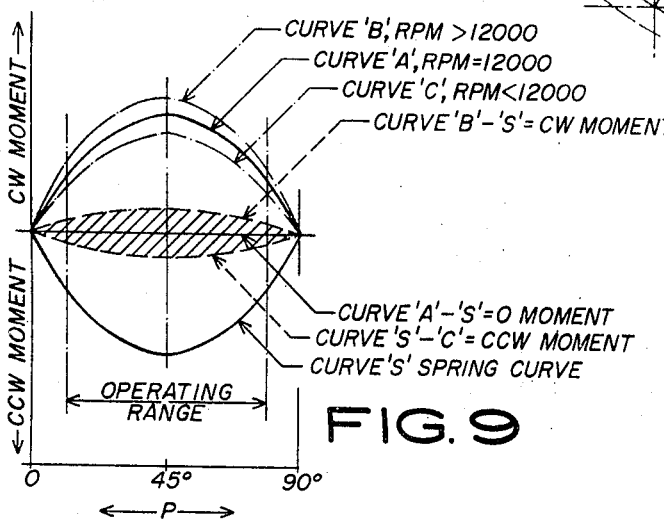

FIGURE 1 is a partial cutaway end view of the turbine embodied in the invention;
FIGURE 2 is a view taken along 2—2 of FIGURE 1;
FIGURE 3 is a view taken along 3—3 of FIGURE 2;
FIGURES 4 and 5 schematically depict the nature of centrifugal twisting moments acting on a rotating blade;
FIGURE 6 schematically depicts a method of canceling the centrifugal twisting moment acting on a rotating blade;
FIGURES 7 and 8 schematically illustrate the principle of blade pitch control embodied in this invention; and
FIGURE 9 shows a family of curves graphically illustrating various twisting moment forces exerted by the flyweight and balance spring with respect to various blade pitch settings at a desired turbine r.p.m., and at speeds above or below this speed.

In FIGURES 1 and 2, a fixed housing 10 encloses an item 12 to be rotationally driven at constant speed by an air driven turbine assembly 14, item 12 being, for example, an A.C. generator. A turbine shaft 16 is rotatably mounted within housing 10 and includes a free end section 17 which extends beyond the fixed housing a short amount. Secured to the shaft by a splined or other suitable connection is a turbine rotor 18 which rotates with the shaft 16 independently of the fixed housing 10. Radial and thrust loads imposed on shaft 16 are reacted by shaft bearings 20 and 21, mounted within fixed housing 10.

As seen in FIGURE 1, a pair of turbine blades 22 extend from diametrically opposite sides of the turbine rotor 18 and are supported by the rotor independently for rotation only about their longitudinal or pitch axes by bearings 24 (FIGURE 2). It is to be understood that the illustrated structure is a preferred embodiment only of this invention, and that any number of blades, including a suitably balanced single blade, could be supported by the rotor, depending on design considerations.

The radially inner root end extremity 26 of each blade 22 is rotatably mounted within a guide bushing 28 provided within a boss structure 30 of the rotor 18 to furnish rigid support for the blade supplemental to the support of bearing 24 for resisting bending loads acting on the blade in a direction normal to the pitch axis. Of course, axial thrust loads acting along the pitch axes of the blades 22 would be reacted through the blade bearings 24 in the illustrated embodiment. As an alternative approach, the boss structure 30 could be omitted and the blade and extremities 26 could be connected to each other in floating relationship if it should be desired, from a design standpoint, that the blades be permitted to tilt a few thousandths of a degree.

Fixedly secured to the root end portion of each blade 22 which extends from the rotor 18 is a centrifugal flyweight 32 shown in detail in FIGURES 1 and 3. Extending radially from the weight element 32 is a flyweight arm portion 34 from which depends a cam element 36, the cam 36 in this case comprising a roller bearing element. It will thus be apparent that the flyweight 32 and blade 22 rotate as a unit about the blade pitch axis, and when such rotation occurs, the cam 36 partakes of similar motion so as to traverse an arc having a center of curvature lying on the blade pitch axis. Further discussion relative to the flyweight 32 will be made below.

Concentrically mounted for independent rotation and axial sliding motion on turbine shaft end 17 is a cam follower element 40 (see FIGURE 2) which normally bears against the flyweight cam 36 under the influence of a coil spring flyweight balancing element 42. The spring 42 is also coaxial with shaft end 17 and bears against the outer race of an antifriction ball type bearing 44 which is mounted at its inner race to the cam follower element 40. A sleeve type bearing element 46 supports the cam follower 40 on shaft end 17, while a fastener 48 holds together the assembly of cam follower 40, ball bearing 44, spring 42 and sleeve bearing 46 all on shaft end 17. It will be noted that the end of spring 42 opposite to that end which bears against the cam follower 40 bears against the inner end wall 50 of turbine rotor 18.

From an observation of FIGURES 2 and 3, it will be seen that motion of cam element 36 towards the left in FIGURE 3, or in a clockwise sense in FIGURE 3, causes motion of the cam follower element towards the left against the force of spring 42. (The flyweight on the opposite blade, of course, rotates in the opposite sense as viewed from FIGURE 3.)

Preliminary to the discussion relative to the nature of each of the flyweights 32 and their function in the turbine speed regulating system embodied in the present invention, a brief review of the dynamic forces developed in a system of this type is in order.

The centerline of a blade (or blade axis) is defined as the radial line along which the aerodynamic sections are stacked. In most cases, the stacking axis runs through the center of gravity (C.G.) of each section and is at right angle to the axis of rotation. The C.G. stacking minimizes bending at the blade root which results from blade centrifugal force (C.F.).

However, even though the resultant C.F. may be made to lie exactly along the blade centerline, there are forces which produce moments about the centerline, the resultants of which tend to orient the blade section in the plane of rotation.

Looking at FIGURES 4 and 5, a turbine blade B rotating about a center of rotation A is depicted schematically. The total or resultant of all centrifugal forces acting on the blade naturally will act in a direction passing through the blade C.G., and, in the case of a symmetrical airfoil such as the blade B illustrated, lies somewhere along its longitudinal centerline or pitch axis L. At first blush, therefore, there is no apparent twisting movement acting on the blade B tending to change its pitch setting P (see FIGURE 5) arising from the centrifugal forces alone (ignoring for the present the aerodynamic twisting moment arising from the offset center of pressure location of the blade relative to its pitch axis).

However, in truth a centrifugal twisting moment does develop in a blade such as B tending to reduce its pitch angle setting P, in the case of a turbine. Consider mass points $m_1$, each located at a distance $x$ from the C.G. axis of the symmetrical blade B. These points $m_1$, lie along radius vectors R, having their center at the center of rotation A of the blade. It will be apparent that centrifugal force vectors C.F. can be drawn representing the total centrifugal forces acting on mass points $m_1$. The vectors C.F., moreover, can readily be seen to have horizontal and vertical components $H_1$ and $V_1$, respectively, on opposite sides and in the plane of rotation of the blade. The horizontal components $H_1$ can produce a twisting moment on the blade about its longitudinal or pitch axis. Since the $H_1$ components act on the blade at mass points $m_1$ with moment arms $y$ as shown in FIGURE 5, the centrifugal twisting moment acting on the blade for this example can be expressed as $CTM_1 = 2yH_1$.

Some further observations can be made relative to this centrifugal twisting moment and the forces contributing to its total effect. In comparing the horizontal vectors $H_1$ and $H_2$ in FIGURE 4, it will be seen that at constant distance $x$, $H_1 = H_2$. This is because as the mass point $m$ moves toward the center of rotation, R becomes smaller as does the total centrifugal force (C.F.) which varies directly as R does; however, the angle $a$ between the C.F. and H vectors decreases as R becomes smaller and the center of rotation is approached, and therefore, the H component for any mass point along the blade is quite independent of the location of $m$ along the blade, and varies only as a function of $x$, which depends on pitch angle P, and r.p.m.$^2$, which contributes to the total C.F. vector.

It can be also shown that the centrifugal twisting moment on a blade such as B will vary with changing pitch angle such that the maximum CTM occurs at $P = 45°$, with the variation of CTM with P following a sine curve. Bear in mind that this centrifugal twisting moment is always present, varying with pitch angle and r.p.m.$^2$, and that if uncorrected tends to rapidly flatten the pitch of the blades of the turbine. In the case of a turbine having variable pitch blades mounted for relatively free rotation about their longitudinal axes, the occurrence of such a pitch change would cause the turbine speed to increase or runaway possibly to the point of structural failure, or to stop completely when the pitch reached zero (flat pitch).

As a practical matter, at low r.p.m., or where frictional forces tending to hold the blades fixed about their pitch axis is high, or still again where mechanical means hold the blades positively locked against undesired pitch change, the centrifugal twisting moment is of no consequence. However, in the case of a variable pitch turbine where the blades are freely mounted for rotation with an automatic speed responsive blade pitch control, and the design r.p.m. of the turbine is in the vicinity of 12,000 r.p.m., then the centrifugal twisting moment is indeed an important, if not critical, consideration, particularly where the internal friction of the blade retention bearing and the pitch control system is minimum. In such a turbine system, it thus becomes imperative that the effect of CTM on the blades be neutralized without affecting the speed governing ability of the system.

One way to eliminate the effect of the centrifugal twisting moment in the blades is to develop an equal and opposite moment.

The centrifugal twisting moment of the entire blade is made up of the moments of the individual sections. Since the blade has a "twist," that is, the blade angle P increases from tip to root, the maximum section moments do not coincide with each other. The maximum moment of the entire blade will occur when P tip is less than 45° and P root is more than 45°. At some intermediate section along the radius, P will be at 45°. This becomes a reference section (which we will call Section S) and for discussion purposes, we can assume the centrifugal twisting moment of the entire blade acts at this section at mass points $m_s$ at chord locations $r_s$. FIGURE 6 illustrates how, by using a counterweight with the proper mass $m$ placed at right angles to section S, which is the section illustrated in FIGURE 6, and with a proper moment arm $r^1$, an equal and opposite centrifugal twisting moment can be applied to the blade. Mathematically, it can be shown that for twisting moment cancellation, $m_s r_s^2 = m^1 r^2$. This equilibrium condition is independent of pitch angle P or r.p.m.

Having eliminated the centrifugal twisting moment effect tending to change the blade pitch setting as a function of absolute pitch and r.p.m.$^2$, there still remains the problem of governing the speed of the turbine by regulating the pitch setting of the turbine blades as a function of r.p.m. In the present invention, this is accomplished by utilizing an additional mass in the counterweight system which will develop a centrifugal twisting moment of its own but in a direction opposite to that of the blade centrifugal twisting moment. This means that an increase in r.p.m. now produces an increase in blade pitch P. While this cures the runaway instability, some additional balance means must be provided or else the system will stabilize at close to 0 r.p.m. In this invention, a spring means is used as the balance for biasing the speed governing weight system so that the turbine will stabilize at some given r.p.m.

Looking at FIGURE 7, it will be seen that weights $c$ cancel the blade centrifugal moment as shown in FIGURE 6. The mass G represents the additional speed governor mass added to the system to produce a speed regulating centrifugal twisting moment. In FIGURE 8, the masses $c$ of FIGURE 7 are ignored since the blade centrifugal twisting moment is cancelled by the reverse moment imparted to the blades by these masses, and therefore the additional weight may be considered to be concentrated as shown with the centrifugal twisting moment in the blade being ignored.

The centrifugal force (C.F.) of G (FIGURE 8) is a function of r.p.m.$^2$ and X, while the spring force (S.F.) is a function of X (displacement) alone. At equilibrium, the centrifugal force of G equals the spring force, or $C.F._G = S.F.$ Since spring force $= kX$ where $k$ is the spring rate and X is the spring displacement, and $C.F._G = M_G S^2 X$ where $M_G$ is the mass of governor weight G, S is the rotational velocity of the turbine an X is displacement (a function of blade pitch P). If an assumed value for S is chosen, i.e., $S_f$ which equals the desired constant speed of the turbine, then a spring can be designed where $k = M_G S_f^2$. Substituting $k$ in the spring force equation above then:

$$S.F. = M_G S_f^2 X = C.F. \text{ when } S = S_f$$

Thus, assuming a spring is used having a spring rate that produces a force that is linear with respect to deflection, and is equal to the above expression for $k$ for a given system, if the turbine speed exceeds the desired speed, then net centrifugal force due to the centrifugal twisting moment acting on the total governor mass will overcome the balance spring force and the blade pitch will increase until the turbine speed slows to the desired fixed speed at which point equilibrium occurs. The opposite occurs when turbine speed falls below that desired. This, then, is the basic governing action of this invention.

At this point it will be appreciated that using the above principles, a turbine speed regulating system can be constructed using the effects of centrifugal twisting moments to both cancel adverse blade centrifugal twisting moments and, when employed with a suitable balance spring means, to regulate the pitch of the blades as a function of sensed r.p.m. to maintain a fixed turbine speed within design limitations.

Referring now again to FIGURES 1 through 3, in operation, the flyweights 32 attached rigidly to each turbine blade 22 comprise the governor weights in this system which respond to centrifugal force by rotating about their respective blade pitch axes as a result of the centrifugal twisting moments which act thereon when the turbine is spinning. With the blades set at very low pitch, increasing speed of rotation above an operational minimum causes each weight 32 (and, of course, each blade) to rotate clockwise in FIGURE 3 against the bias of spring 42. This increases the pitch of the blades to begin the speed regulation process until equilibrium is reached between centrifugal forces of the flyweight and the spring force at the desired constant r.p.m. At the same time, because of the mass distribution of flyweights 32, as explained below, centrifugal twisting moments acting on the blade itself are cancelled. Any change in conditions tending to produce a variation of the turbine speed upsets the spring balance centrifugal twisting moment condition to produce a blade pitch change tending to restore equilibrium, and necessarily, design r.p.m.

It should be noted that each flyweight 32 acts on spring 42 through its own moment arm 34 so that when reference is made to the net centrifugal force exerted by a flyweight, this means the force exerted by it due to the centrifugal twisting moment acting on the flyweight and applied through its own moment arm. At equilibrium, the total net centrifugal forces from the flyweights of both blades is exactly matched and balanced by the force of spring 42. The blades 22 moreover, are not directly interconnected (such as by a gear, for example) so that forces exerted by each flyweight against the balance spring tend to equalize and not cock the spring. (The two blade pitch angles may differ slightly at operational speeds because of manufacturing tolerances.) Also, of course, the spring rate is calculated to take into account the moment arm through which the centrifugal twisting moment of the flyweights act.

Each of the governor flyweights 32 shown in detail in FIGURE 3 is generally cruciform in plan view and includes diametrically opposed mass sections 52 and a mass section 54 which balances the flyweight arm 34 and 36 which it diametrically opposes. All of the mass sections are substantially coplanar and integral according to the preferred embodiment, although variations in the physical construction of the flyweight elements are possible without departing from the scope of this invention. For example, it is quite feasible that the flyweights 32 for each blade could be located on the opposite side of the axis of rotation of each blade so as to minimize the thrust loads on the blade retention bearings. (The radial centrifugal loads imposed on the flyweights would then cancel their radial thrust loadings on the blade retention bearings.) In any event, it is imperative that the total mass distribution of the flyweights 32 be such that the centrifugal twisting moment on the blades is neutralized in each case, and, in addition, a speed governing mass is available to exert a centrifugal twisting moment against a balance spring having a spring rate that is such that spring force varies linearly with displacement, whereby at the desired turbine speed the net centrifugal twisting force of the flyweight is equal to the spring force against which it is acting through its own moment arm 34.

The effect of frictional forces in a system of this type cannot be ignored. The sensitivity of the speed regulator is dependent to a large extent on the degree of internal friction present in the turbine speed control system.

Consider the curves in FIGURE 9 for the moment. Here, clockwise moment exerted by the flyweight 32 (as viewed in FIGURE 3) is plotted against counterclockwise moment exerted by the spring 42 for various ranges of pitch angle and at various speeds. Assuming a desired speed of 12,000 r.p.m., curve A shows the flyweight moment available at this speed across a range of pitch settings. The curve S is the spring curve for a constant rate spring and is constant for all speeds. Curves B and C depict available clockwise moments at some speeds just above or below the desired 12,000 r.p.m., respectively. Curve B–S then represents maximum available clockwise moment and curve S–C, the maximum available counterclockwise moment. The shaded area between these curves therefore represents the torque available to overcome friction of the system and to change the blade pitch angle upon change in r.p.m. The greater the friction, the greater the r.p.m. variation from that desired is necessary to change the blade pitch to correct for the difference between desired and actual speeds.

In the system of the present invention, internal friction of the turbine speed regulating system has been minimized by using a roller bearing for the flyweight cam 36, by allowing the cam follower to rotate freely about the turbine shaft end 17 on sleeve bearing 46, by using a ball type bearing 44 between the spring 42 and cam follower, and by using a friction free ball type bearing as the blade retaining bearing 24.

While maximum or minimum blade pitch stops have not been shown in the drawings, these could readily be provided if desired.

What is claimed is:
1. An air driven turbine which comprises:
(a) a rotor,
(b) at least one radially extending blade secured to said rotor at the root end thereof for rotation about the pitch axis of said rotor,
(c) said blade having an integral centrifugal flyweight mass attached rigidly thereto at said root end for rotation with said blade about said pitch axis,
(d) said flyweight mass having two portions spaced radially with respect to each other to define a mass distribution which, when the turbine is rotationally operative, provides a centrifugal twisting moment which precisely balances the centrifugal twisting moment acting on said blade and also provides an additional resulting centrifugal twisting moment tending to increase the pitch of the blade with increasing speed of rotation of said turbine,
(e) a spring operatively connected between said flyweight mass and said rotor for balancing said additional resulting twisting moment of said flyweight mass at a predetermined desired speed of said turbine, said spring having a spring rate which produces a force which varies linearly with the displacement thereof,
(f) said flyweight mass having an arm portion integral therewith and extending radially outward from said blade pitch axis, said arm portion defining a cam portion moveable with said flyweight mass in an arc about said blade pitch axis,
(g) a cam follower between said flyweight mass and said spring, said cam follower directly engaging said cam portion and following the motion of said flyweight mass to effect displacement of said spring upon cam motion and transmittal of spring force to said cam element.

2. The air driven turbine of claim 1 wherein said centrifugal flyweight mass including the cam portion comprises a generally planar element that is cruciform in plan view with diametrically opposed mass sections, and having a depending extension from one mass section, said depending extension including the said cam portion, the diametrically opposite mass section from the said one mass section constituting a counterweight mass for said cam portion and the said one mass section, and the other pair of opposed mass sections comprising both the blade centrifugal twisting moment balancing mass and the resultant centrifugal twisting moment speed regulating mass.

3. The turbine of claim 1 wherein said spring balance means is a coil spring concentrically mounted with respect to the axis of rotation of said rotor, and rotatable therewith, and said cam follower comprises an annular disc member concentrically mounted with respect to the axis of rotation of the rotor and axially translatable in a direction parallel thereto, and further including a planar cam follower surface in frictional contact with the cam of the flyweight mass and extending radially with respect to the rotor axis of rotation, a bearing means mounting said cam follower surface for rotation independently of said spring about said rotor axis of rotation, the arcuate motion of the flyweight cam about the blade pitch axis causing axial translation of the cam follower in a direction parallel to the rotor axis of rotation and axial displacement of one end of the coil balance spring, the other end of said spring being held fixed against axial movement with respect to said cam follower.

4. The air driven turbine of claim 1 wherein said centrifugal flyweight mass including the cam portion comprises a generally planar element that is cruciform in plan view with diametrically opposed mass sections, and having a depending extension from one mass section, said depending extension including the said cam portion, the diametrically opposite mass section from the said one mass section constituting a counterweight mass for said cam portion and the said one mass section, and the other pair of opposed mass sections comprising both the blade centrifugal twisting moment balancing mass and the resultant centrifugal twisting moment speed regulating mass, and further wherein said cam follower comprises an annular disc member concentrically mounted with respect to the axis of rotation of the rotor and axially translatable in a direction parallel thereto, the said cam follower being disposed in a plane normal to the plane of the said flyweight mass and adjacent thereto so as to be engageable by the depending cam portion of the said flyweight mass when said mass rotates about the blade pitch axis.

5. The turbine of claim 3 wherein said coil spring is preloaded axially against said cam follower, and wherein said bearing means comprises an anti-friction bearing between the coil balance spring and said follower surface for enabling fee rotation of the cam follower surface with respect to the coil spring about the axis of rotation of the turbine.

6. The turbine of claim 5 wherein said turbine rotor is mounted to a turbine shaft for rotation therewith and comprises a housing for the root end of the turbine blade, the centrifugal flyweight means, the coil balance spring, the cam follower and the anti-friction bearing, and wherein said cam follower is slidable and rotatably connected to said turbine rotor shaft by means of a sleeve bearing which maintains the cam follower in axial alignment with the turbine rotor shaft.

7. The turbine of claim 6 wherein a plurality of turbine blades are provided, each having its own associated flyweight means as recited in claim 1, and being independently attached to the turbine rotor for rotation about its respective pitch axis, the cam of each flyweight mass of each blade engaging the said cam follower independently for collectively biasing the balance coil spring when the turbine is operationally rotating.

References Cited

UNITED STATES PATENTS

| | | | |
|---|---|---|---|
| 2,777,524 | 1/1957 | Chapman et al. | 170—160.16 X |
| 2,876,847 | 3/1959 | Blackburn et al. | 170—160.16 X |
| 2,967,572 | 1/1961 | Breaux et al. | |
| 2,997,109 | 8/1961 | Blackburn | 170—160.16 X |
| 3,013,613 | 12/1961 | Blackburn | 170—160.16 X |

EVERETTE A. POWELL, Jr., Primary Examiner

U.S. Cl. X.R.

170—160.53